(12) United States Patent
Braun

(10) Patent No.: US 6,715,138 B2
(45) Date of Patent: Mar. 30, 2004

(54) METHOD FOR COMBINING LOGIC-BASED CIRCUIT UNITS AND MEMORY-BASED CIRCUIT UNITS AND CIRCUIT ARRANGEMENT

(75) Inventor: Georg Braun, Munich (DE)

(73) Assignee: Infineon Technologies AG, Munich (DE)

( * ) Notice: Subject to any disclaimer, the term of this patent is extended or adjusted under 35 U.S.C. 154(b) by 9 days.

(21) Appl. No.: 10/164,453

(22) Filed: Jun. 6, 2002

(65) Prior Publication Data
US 2003/0014723 A1 Jan. 16, 2003

(30) Foreign Application Priority Data
Jun. 11, 2001 (DE) .......................................... 101 28 238

(51) Int. Cl.[7] .............................................. G06F 17/50
(52) U.S. Cl. ....................................................... 716/10
(58) Field of Search ............................... 716/1, 10, 8, 9, 716/11; 365/227, 226, 185.05, 154; 327/538; 326/39; 257/616, 371, 315; 235/492

(56) References Cited

U.S. PATENT DOCUMENTS

| 5,790,839 A | 8/1998 | Luk et al. | |
| 6,418,075 B2 * | 7/2002 | Shimano et al. | 365/227 |
| 6,455,901 B2 * | 9/2002 | Kameyama et al. | 257/371 |
| 6,594,193 B2 * | 7/2003 | Tsu-Jae | 365/226 |

OTHER PUBLICATIONS

Tsuneaki Fuse, "A 0.5-V power-supply scheme for low--power system LSIs using multi-V/sub th/ SOI CMOS technology", Feb. 2003, Solid-State Circuits, IEEE Journal of, vol.: 38 Issue: 2, Page(s): 303-311.*

Matsumoto et al., "Integration of a Power Supply for System-on-Chip," IEICE Trans. Fundamentals, vol. E80-A (No. 2), p. 276-282, (1997).

* cited by examiner

Primary Examiner—Leigh M. Garbowski
Assistant Examiner—Helen Rossoshek
(74) Attorney, Agent, or Firm—Jenkins, Wilson & Taylor, P.A.

(57) ABSTRACT

A method for combining logic-based circuit units and memory-based circuit units in a common circuit arrangement is provided. The different supply voltage swings are fed to the different units wherein a signal voltage swing at a connection line between the memory-based circuit unit and the logic-based circuit unit is adjusted such that in the case of logic-based circuit units the signal voltage swing is provided in the range between a signal voltage minimum value of 0.4V and a signal voltage maximum value of 0.8V.

7 Claims, 2 Drawing Sheets

METHOD FOR COMBINING LOGIC-BASED CIRCUIT UNITS AND MEMORY-BASED CIRCUIT UNITS AND CIRCUIT ARRANGEMENT

DESCRIPTION

Method for combining logic-based circuit units and memory-based circuit units and circuit arrangement.

TECHNICAL FIELD

The present invention relates to a method for providing supply voltage potentials and ground potentials in circuit arrangements and systems with a high data transfer rate, and relates, in particular, to a method for combining logic-based circuit units and memory-based circuit units in a circuit arrangement or in a circuit system, in which different supply voltage swings are provided.

BACKGROUND ART

A performance of circuit arrangements and systems rises with an increasing integration density, in particular whole systems being arranged on a single chip. These circuit systems, known under the designation SoC (system on chip), have the advantage that it is possible to provide a high integration density and a functionality at a high level, although a process complexity increases in a disadvantageous manner.

In particular—but not exclusively—the process complexity of such systems rises by virtue of the fact that logic functions are integrated together with memory functions which are present on an SoC system. Furthermore, for cost reasons, large chip areas are fabricated in order to further increase a functionality of SoC systems. In the case of more extensive circuit systems, it is not desirable—or even impossible—to integrate all the functionalities on a chip, in particular the functionalities are separated according to a type of functionality, e.g. into memory-based and logic-based functionalities, so that memory-based circuit units and logic-based circuit units are integrated on different chips and communicate with one another by means of interface circuit units via signals which have a defined signal voltage swing.

The fabrication process for integrated circuits on a chip can be optimized, then, for the individual types of functionality, a difference between logic-based circuit units and memory-based circuit units increasing with increasing integration and performance.

In the case of logic-based circuit units, increasingly thin gate oxides, low threshold voltages and low supply voltage potentials or supply voltage swings are used, which are provided as voltage differences between a supply voltage potential and a ground potential.

By contrast, in the case of memory-based circuit units, thick gate oxides, high threshold voltages and thus also higher supply voltage potentials or supply voltage swings are required. For cost reasons, it is not practicable in large scale integrated systems with a high transfer rate to operate logic-based circuit units and memory-based circuit units with identical or similar supply voltage potentials, ground potentials and/or supply voltage swings. In computer-aided systems, in data transfer systems and generally in complex circuit systems, different logic-based circuit units are used together with memory-based circuit units, information being exchanged between logic-based circuit units and memory-based circuit units in the form of signals with defined signal voltage swings.

FIG. 2 shows a circuit arrangement according to the prior art in which a logic-based circuit unit 101 and a memory-based circuit unit 102 are connected to one another via a signal path, information being exchanged between the memory-based circuit unit 102 and the logic-based circuit unit 101 with signals whose signal voltage swing 105 is provided between a signal voltage minimum value 110 and a signal voltage maximum value 109, the signal voltage swing 105 varying by a signal voltage swing average value 108 or an arithmetic mean.

The signal voltage swing 105 typically lies in the region of 400 mV, but smaller or larger values of the signal voltage swing 105 can also be set.

As illustrated in FIG. 2, the logic-based circuit unit 101 and the memory-based circuit unit 102 can be provided with different supply voltage potentials 103a and 103b, respectively, with respect to a ground potential 107, a supply voltage swing 111a being applied to the logic-based circuit unit 101, while a supply voltage swing 111b is applied to the memory-based circuit unit 102.

The arrow 112 illustrated on the left in FIG. 2 designates the supply voltage potential, a positive supply voltage increasing in the direction of the arrow 112 proceeding from a ground potential 107 (0 V). Consequently, a supply voltage potential 103a which is less than the ground potential 107 is applied to the logic-based circuit unit shown in FIG. 2, while a higher supply voltage potential 103b is applied to the memory-based circuit unit 102. Consequently, in the circuit arrangement shown in FIG. 2, the supply voltage swing 111a at the logic-based circuit unit 101 is likewise smaller than the supply voltage swing 111b at the memory-based circuit unit 102.

For optimization of a functionality, it is necessary, on account of the production process for integrated circuits, for the supply voltage swing 111a of the logic-based circuit unit 101 to lie below the supply voltage swing 111a of the memory-based circuit unit 102.

Consequently, it is a disadvantage of conventional circuit arrangements for combining logic-based circuit units and memory-based circuit units that a supply voltage swing cannot be reduced arbitrarily, since a predetermined signal voltage swing must be maintained in order to ensure a reliable communication between a logic-based circuit unit and a memory-based circuit unit.

SUMMARY OF THE INVENTION

With increasing integration, memory-based circuit units increasingly require supply voltage swings which can destroy logic-based circuit units or load them to an excessive extent, since the logic-based circuit units are more sensitive to high supply voltage potentials on account of their thin gate oxides.

A further disadvantage of the conventional circuit arrangement is that logic-based circuit units and memory-based circuit units are connected to an identical ground potential, thereby reducing a variability when defining a supply voltage potential for the respective circuit unit given a predetermined signal voltage swing.

A further disadvantage of conventional circuit arrangements is that a signal voltage swing average value can only be varied within narrow limits with respect to the supply voltage potentials and the ground potential.

Therefore, it is an object of the present invention to provide a method for combining logic-based circuit units and memory-based circuit units in a circuit arrangement in which different supply voltage swings are provided, a variation of the ground potential being provided in addition to a variation of the supply voltage potential.

This object is achieved according to the invention by means of the method and apparatus defined by the claims, which follow.

Further refinements of the invention emerge from the subclaims.

An essential concept of the invention consists in providing different ground potentials for logic-based circuit units and memory-based circuit units by means of the provision of different ground potential differences with respect to a reference ground potential for logic-based circuit units and memory-based circuit units.

The invention's method for combining logic-based circuit units and memory-based circuit units in a circuit arrangement essentially has the following steps:

a) provision of at least one supply voltage potential for at least one logic-based circuit unit;

b) provision of at least one ground potential for the logic-based circuit unit;

c) provision of at least one supply voltage potential for at least one memory-based circuit unit;

d) provision of at least one ground potential for the memory-based circuit unit;

e) provision of a signal voltage swing, which is set between a signal voltage minimum value and a signal voltage maximum value, in order to enable a communication or an exchange of information between the memory-based circuit unit and the logic-based circuit unit, the signal voltage swing being applied both to the memory-based circuit unit and to the logic-based circuit unit; and f) setting of at least one ground potential difference between the at least one ground potential of the logic-based circuit unit and the memory-based circuit unit and a reference ground potential in such a way that at least one supply voltage swing is applied to the logic-based circuit unit and the memory-based circuit unit, the signal voltage swing being provided in such a way that a supply voltage potential or a supply voltage swing of circuit units in the circuit arrangement is not exceeded.

Advantageous developments and improvements of the respective subject matter of the invention can be found in the subclaims.

In accordance with one preferred development of the present invention, the signal voltage swing in the case of logic-based circuit units is provided in the range between a signal voltage minimum value of 0.4 V and a signal voltage maximum value of 0.8 V.

In accordance with yet another preferred development of the present invention, the signal voltage swing in the case of logic-based circuit units is provided in the range between 0.4 V and 0.8 V, a signal voltage swing average value being set in such a way that the signal voltage maximum value does not exceed 1.0 V.

In accordance with yet another preferred development of the present invention, the signal voltage swing which is applied to memory-based circuit units is adapted to the signal voltage swing of the logic-based circuit units.

The invention's circuit arrangement for combining logic-based circuit units and memory-based circuit units, in which different supply voltage swings are provided, furthermore has at least one supply voltage source, which has the following features:

a) provision of at least one supply voltage potential for at least one logic-based circuit unit;

b) provision of at least one ground potential for the logic-based circuit unit;

c) provision of at least one supply voltage potential for the at least one memory-based circuit unit, the supply voltage potential for the memory-based circuit unit being different from the supply voltage potential for the logic-based circuit unit; and d) provision of at least one ground potential for the memory-based circuit unit, the ground potential for the memory-based circuit unit being different from the ground potential for the logic-based circuit unit.

BRIEF DESCRIPTION OF THE DRAWINGS

Exemplary embodiments of the invention are illustrated in the drawings and are explained in more detail in the description below. In the drawings.

DETAILED DESCRIPTION OF THE INVENTION

In the figures, identical reference symbols designate identical or functionally identical components or steps.

Exemplary Embodiments

Figure 1:
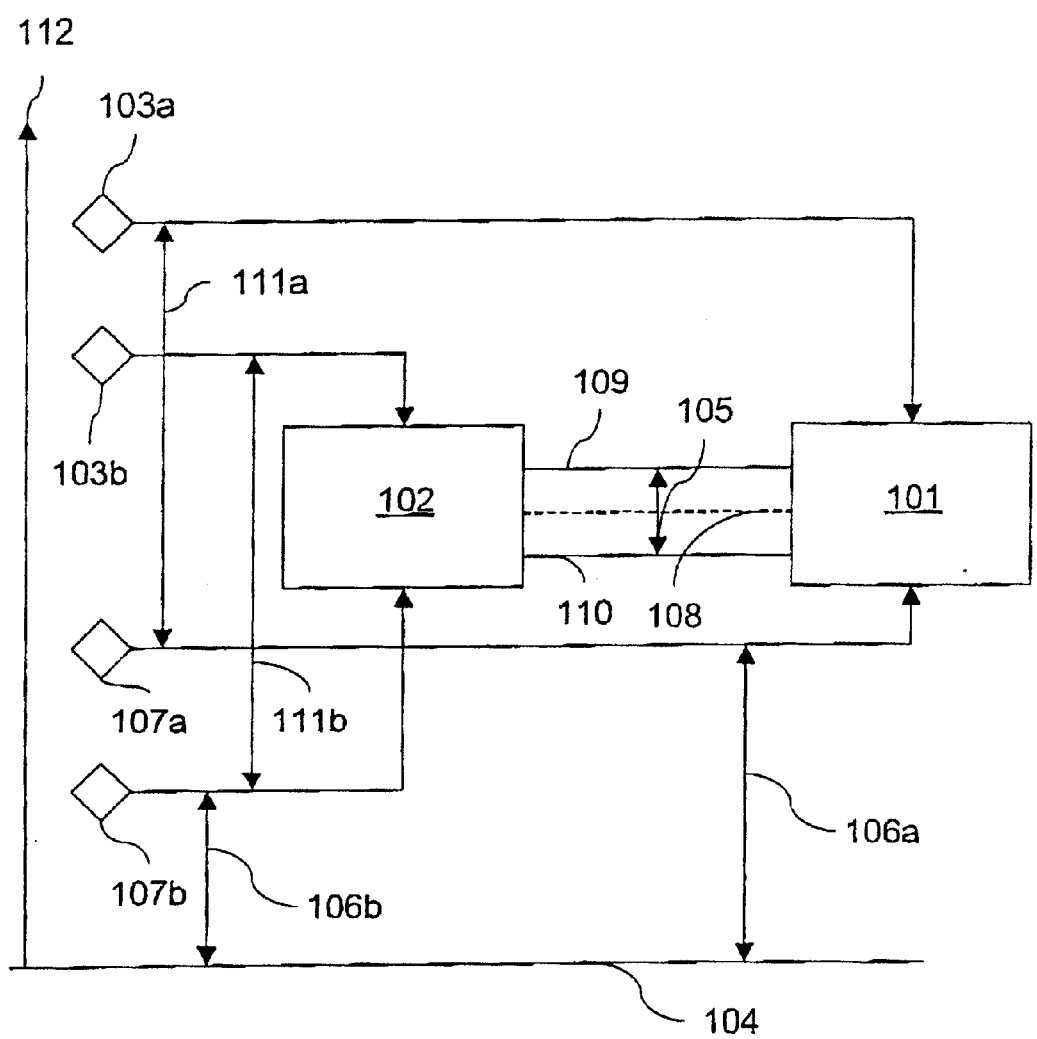
FIG. 1 shows a circuit arrangement in accordance with an exemplary embodiment of the present invention.

FIG. 1 shows an exemplary embodiment according to the present invention for combining logic-based circuit units and memory-based circuit units. By way of example, FIG. 1 illustrates two circuit units, a logic-based circuit unit 101 and a memory-based circuit unit 102.

However, it shall be pointed out that more than one logic-based circuit unit 101 and more than one memory-based circuit unit 102 can be arranged and connected to one another.

Furthermore, it is clearly evident that any desired circuit units which require adjustable supply voltage potentials and ground potentials can be provided as circuit units 101 and 102, respectively. The circuit arrangement shown in FIG. 1 makes it possible to provide the logic-based circuit unit 101 and the memory-based circuit unit 102 with different ground potentials 107a and 107b, respectively, and/or different supply voltage potentials 103a and 103b, respectively.

The arrow 112 shown in FIG. 1 represents the magnitude of a supply voltage potential relative to a reference ground potential 104. Voltage potentials can then be set as desired with respect to the reference ground potential 104 by means of a supply voltage source (not shown). A signal path is illustrated between the circuit units 101, 102 shown in FIG. 1, said signal path being characterized by a signal voltage swing 105, the latter describing a signal which varies between a signal voltage minimum value 110 and a signal voltage maximum value 109 around a signal voltage swing average value 105 or around an arithmetic mean.

For operation of the logic-based circuit unit 101, a supply voltage swing 111a is provided, which is defined by a potential difference between a supply voltage potential 103a and a ground potential 107a, while the memory-based circuit unit 102 is provided with a supply voltage swing 111b for operation which is provided by a potential difference between a supply voltage potential 103b and a ground potential 107b. Since, as already mentioned, all the supply voltage potentials 103a, 103b and all the ground potentials 107a, 107b are adjustable in a variable manner along a supply voltage potential axis 112, it is thus possible to establish any desired supply voltage swings 111a, 111b with respect to a fixedly predetermined signal voltage swing 105.

By way of example, it shall be assumed that, on account of its functionality and on account of the thick gate oxides applied in the production process, a memory-based circuit unit 102 requires a high supply voltage swing 111b in order to provide an adequate memory functionality.

Typically, a supply voltage swing of 2.5 V is applied to the memory-based circuit unit 102, a ground potential 107b being intended to be at 0 V or the reference ground potential 104, so that the ground potential difference 106b tends toward 0, while the supply voltage potential 103b for the memory-based circuit unit 102 is intended to be at 2.5 V relative to the reference ground potential 104. If a logic-based circuit unit 101 were operated with the supply voltage potential 103a of 2.5 V, then the functionality would be jeopardized or the logic-based circuit unit 101 would be damaged or destroyed by an excessively large supply voltage swing 111a. Logic-based circuit units usually operate with a supply voltage potential 103a of 1.0 V to 1.8 V, endeavors being made in fabrication engineering, for future logic-based modules, to lower a maximum supply voltage potential with respect to 0 V or the reference ground potential 104 from 1.8 V through 1.5 V and 1.3 V further to 1.0 V.

In this example, a logic-based circuit unit 101 designed for 1.0 V supply voltage potential 103a relative to a reference ground potential 104 would be destroyed or greatly jeopardized by a supply voltage potential 103b of the memory-based circuit unit 102 of 2.5 V. In order that the logic-based circuit unit 101 is nevertheless provided with a supply voltage swing 111a of not more than 1.0 V, in the method according to the invention, a ground potential difference 106a is provided which defines a potential difference between the ground potential 107a provided for the logic-based circuit unit 101 and the reference ground potential 104.

Consequently, a supply voltage swing 111a between a supply voltage potential 103a and a ground potential 107a can be chosen freely with regard to the magnitude and position around an average value of a DC component.

Consequently, it is an advantage of the present invention that a predetermined signal voltage swing 105 can be maintained for a communication between the logic-based circuit unit 101 and the memory-based circuit unit 102, while it is possible to set different supply voltage swings 111a and 111b, respectively, with a different DC component.

The logic-based circuit unit 101 is generally defined by a circuit unit to which a low supply voltage swing 111a is applied, while the memory-based circuit unit 102 is generally defined as a circuit unit to which is applied a high supply voltage swing 111b compared with the supply voltage swing 111a, as is clearly discernible to average persons skilled in the art.

Figure 2:
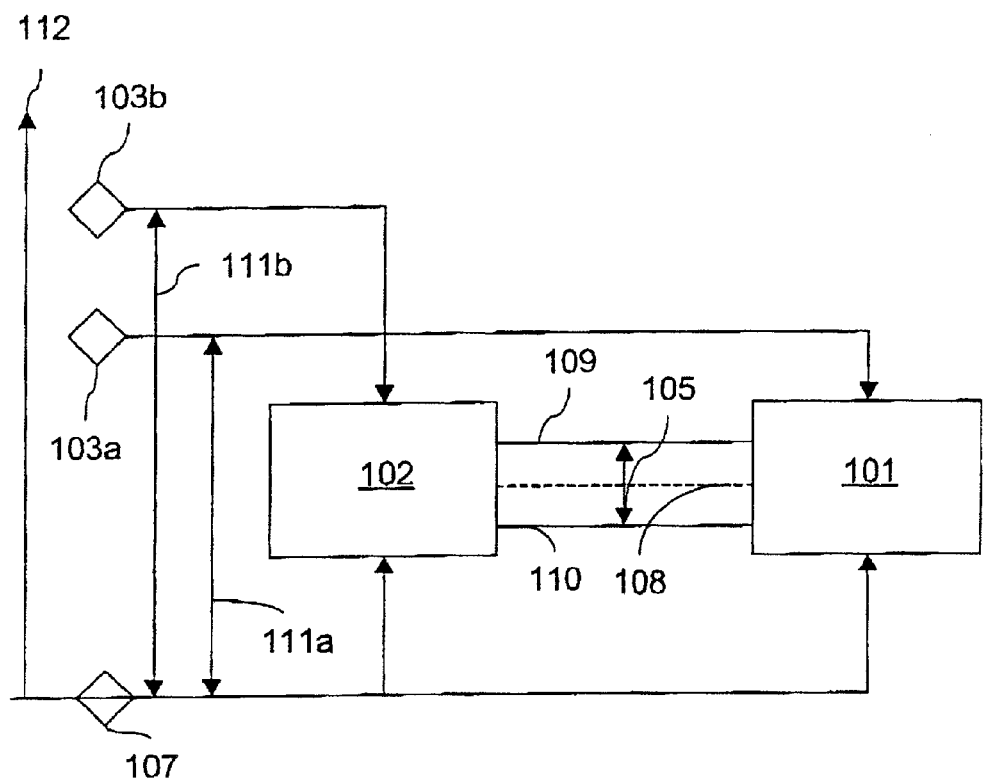
FIG. 2 shows a conventional circuit arrangement for combining logic-based circuit units and memory-based circuit units.

With regard to the conventional circuit arrangement for combining logic-based circuit units and memory-based circuit units which is illustrated in FIG. 2, reference is made to the introduction to the description.

Although the present invention has been described above using preferred exemplary embodiments, it is not restricted thereto but rather can be modified in diverse ways.

List of Reference Symbols

In the figures, identical reference symbols designate identical or functionally identical components or steps.

| | |
|---|---|
| 101 | Logic-based circuit unit |
| 102 | Memory-based circuit unit |
| 103a, 103b | Supply voltage potential |
| 104 | Reference ground potential |
| 105 | Signal voltage swing |
| 106a, 106b | Ground potential difference |
| 107, 107a, 107b | Ground potential |
| 108 | Signal voltage swing average value |
| 109 | Signal voltage maximum value |
| 110 | Signal voltage minimum value |
| 111a, 111b | Supply voltage swing |
| 112 | Supply voltage potential |

What is claimed is:

1. Method for combining logic-based circuit units and memory-based circuit units in a circuit arrangement, in which different supply voltage swings are provided, having the following steps:
   a) provision of at least one supply voltage potential for at least one logic-based circuit unit;
   b) provision of at least one ground potential for the logic-based circuit unit, in order thus to provide a supply voltage swing for the logic-based circuit unit;
   c) provision of at least one supply voltage potential for at least one memory-based circuit unit;
   d) provision of at least one ground potential for the memory-based circuit unit, in order thus to provide a supply voltage swing for the memory-based circuit unit;
   e) provision of a signal voltage swing, which is set between a signal voltage minimum value and a signal voltage maximum value and is applied both to the logic-based circuit unit and to the memory-based circuit unit; and
   f) setting of at least one ground potential difference between the at least one ground potential and a reference ground potential in such a way that the logic-based circuit unit and the memory-based circuit unit are supplied with at least one supply voltage swing, and that the signal voltage swing is provided without a supply voltage swing of the circuit units being exceeded, wherein the signal voltage swing in the case of logic-based circuit units is provided in the range between a signal voltage minimum value of 0.4 V and a signal voltage maximum value of 0.8 V.

2. Method for combining logic-based circuit units and memory-based circuit units in a circuit arrangement according to claim 1, wherein the signal voltage swing in the case of memory-based circuit units is adapted to the signal voltage swing in the case of logic-based circuit units.

3. Method for combining logic-based circuit units and memory-based circuit units in a circuit arrangement, in which different supply voltage swings are provided, having the following steps:
   a) providing at least one supply voltage potential for at least one logic-based circuit unit;
   b) providing at least one ground potential for the logic-based circuit unit, in order thus to provide a supply voltage swing for the logic-based circuit unit;
   c) providing at least one supply voltage potential for at least one memory-based circuit unit;
   d) providing at least one around potential for the memory-based circuit unit, in order thus to provide a supply voltage swing for the memory-based circuit unit;
   e) providing a signal voltage swing, which is set between a signal voltage minimum value and a signal voltage maximum value and is applied both to the logic-based circuit unit and to the memory-based circuit unit; and f) setting at least one ground potential difference between the at least one ground potential and a reference around potential in such a way that the logic-based circuit unit and the memory-based circuit unit are supplied with at least one supply voltage swing, and that the signal voltage swing is provided without a supply voltage swing of the circuit units being exceeded, wherein the signal voltage swing is provided in the range between 0.4 V and 0.8 V, a signal voltage swing average value being set in such a way that the signal voltage maximum value does not exceed 1.0 V.

4. Circuit arrangement for combining logic-based circuit units and memory-based circuit units, in which different supply voltage swings are provided, having:

at least one supply voltage source a) for providing at least one supply voltage potential for at least one logic-based circuit unit;

b) for providing at least one ground potential for the logic-based circuit unit, in order to provide a supply voltage swing for the logic-based circuit unit;

c) for providing at least one supply voltage potential for at least one memory-based circuit unit;

d) for providing at least one ground potential for the memory-based circuit unit, in order to provide a supply voltage swing for the memory-based circuit unit;

e) for providing of a signal voltage swing, which is set between a signal voltage minimum value and a signal voltage maximum value and is applied both to the logic-based circuit unit and to the memory-based circuit unit; and f) for setting of at least one around potential difference between the at least one around potential and a reference ground potential in such a way that the logic-based circuit unit and the memory-based circuit unit are supplied with at least one supply voltage swing, and that the signal voltage swing is provided without a supply voltage swing of the circuit units being exceeded, wherein the signal voltage swing in the case of logic-based circuit units is provided in the range between a signal voltage minimum value of 0.4 V and a signal voltage maximum value of 0.8 V.

5. Circuit arrangement for combining logic-based circuit units and memory-based circuit units according to claim 4, wherein a logic-based circuit unit is generally a circuit unit to which a low supply swing is applied.

6. Circuit arrangement for combining logic-based circuit units and memory-based circuit units according to claim 4, wherein a memory-based circuit unit is generally a circuit unit to which a high supply voltage swing is applied.

7. Circuit arrangement for combining at least two circuit units according to claim 4, wherein at least one different supply voltage potential and/or at least one different ground potential is provided for the at least two circuit units.

* * * * *